(12) United States Patent
Cravens

(10) Patent No.: US 8,128,132 B2
(45) Date of Patent: Mar. 6, 2012

(54) PEST CONTROL SEAL FOR RECREATIONAL VEHICLE

(75) Inventor: Jerry R. Cravens, Mt. Juliet, TN (US)

(73) Assignee: RTC Technical Services Inc., Mount Juliet, TN (US)

( * ) Notice: Subject to any disclaimer, the term of this patent is extended or adjusted under 35 U.S.C. 154(b) by 992 days.

(21) Appl. No.: 11/544,755

(22) Filed: Oct. 10, 2006

(65) Prior Publication Data

US 2008/0084032 A1 Apr. 10, 2008

(51) Int. Cl.
*F16L 17/00* (2006.01)

(52) U.S. Cl. ........ 285/345; 285/108; 285/109; 285/205; 285/379; 285/382.5

(58) Field of Classification Search .......... 285/108–109, 285/137.11, 139.1, 139.2, 139.3, 142.1, 345–346, 285/379, 382.4, 382.5, 204–205, 211–212, 285/219–221, 136.1; 52/219, 220.8; 119/484; 138/106–107
See application file for complete search history.

(56) References Cited

U.S. PATENT DOCUMENTS

| | | | | |
|---|---|---|---|---|
| 6,661 A | | 9/1875 | Lighthall | |
| 463,890 A | * | 11/1891 | Cross | 277/606 |
| 549,419 A | * | 11/1895 | Wright | 277/553 |
| 1,138,946 A | * | 5/1915 | Elliott | 285/354 |
| 1,635,749 A | * | 7/1927 | Hosmer | 285/61 |
| 1,872,498 A | * | 8/1932 | Rasmussen et al. | 277/323 |
| 2,237,680 A | * | 4/1941 | Mark | 277/329 |
| 2,258,941 A | * | 10/1941 | Wayman | 285/149.1 |
| 2,537,678 A | * | 1/1951 | Koetting | 165/157 |
| 2,812,959 A | * | 11/1957 | Fuller | 285/137.11 |
| 2,819,915 A | * | 1/1958 | Woodson | 241/46.015 |
| 2,919,147 A | * | 12/1959 | Nenzell | 285/89 |
| 2,946,525 A | * | 7/1960 | Thierer | 241/46.015 |
| 3,240,515 A | * | 3/1966 | Schmohl | 285/212 |
| 3,246,132 A | * | 4/1966 | Jordan et al. | 285/139.2 |
| 3,761,114 A | | 9/1973 | Blakeley | |
| 3,934,904 A | * | 1/1976 | Hord | 285/139.3 |
| 3,982,703 A | * | 9/1976 | Meyers | 241/46.015 |
| 4,722,556 A | | 2/1988 | Todd | |

(Continued)

FOREIGN PATENT DOCUMENTS

EP 603775 6/1994

OTHER PUBLICATIONS http://www.npc.com/products/pipe-connectors/pipe-adaptor.htm, "Cost-Effective Watertight Seals For Corrugated Pipe," two sheets printed Aug. 14, 2006.

*Primary Examiner* — Aaron Dunwoody
*Assistant Examiner* — Fannie Kee
(74) *Attorney, Agent, or Firm* — Richard C. Litman

(57) ABSTRACT

The pest control seal for a recreational vehicle (RV) comprises a relatively soft and resilient foam material, which is compressed into the annular opening between the conduit and a passage through the wall or panel of the service compartment of the RV, and a relatively thin, hard retainer, which is attached to the rim or flange of the hose or conduit opening or passage. The foam material and retainer may be attached to each other, or may be installed as separate pieces held in place by compression and suitable fasteners. The retainer may be formed as two semicircular components, or as a single annular piece.

1 Claim, 5 Drawing Sheets

U.S. PATENT DOCUMENTS

| | | |
|---|---|---|
| 4,758,027 A | 7/1988 | Todd |
| 4,796,926 A | 1/1989 | Rapsilver |
| 4,835,405 A * | 5/1989 | Clancey et al. ............... 290/1 A |
| 4,881,662 A * | 11/1989 | Tallman ........................... 222/81 |
| 5,023,959 A | 6/1991 | Mercer |
| 5,971,444 A | 10/1999 | Hawkins |
| 6,735,810 B2 * | 5/2004 | Najm et al. ..................... 15/313 |
| 6,761,380 B2 | 7/2004 | Pachciarz et al. |
| 6,860,518 B2 | 3/2005 | Krauss et al. |
| 2003/0034650 A1 | 2/2003 | Krauss et al. |
| 2004/0164548 A1 * | 8/2004 | Richey et al. .................. 285/89 |
| 2005/0217882 A1 | 10/2005 | Rizzuto, Jr. |

* cited by examiner

PEST CONTROL SEAL FOR RECREATIONAL VEHICLE

BACKGROUND OF THE INVENTION

1. Field of the Invention

The present invention relates generally to recreational vehicle drain and supply hoses, electrical lines and cables therefor, and to elastomeric seals and the like. More particularly, the present invention comprises various embodiments of a pest control seal for a recreational vehicle that provides a seal about the waste drain hose and/or other conduits entering or leaving a recreational vehicle to seal the various passages through a wall or panel of the service compartment of the vehicle, thereby preventing rodents and other pests from gaining access to the recreational vehicle.

2. Description of the Related Art

Most recreational vehicles (RVs) are sufficiently well equipped to allow a small family to live independently for at least a few days at a time while on the road. Such vehicles are equipped with sleeping facilities for a small number of people, as well as cooking and simple bathroom facilities. Larger vehicles may include most, or all, of the amenities found in many homes.

Of course, the provision of kitchen and bathroom facilities in an RV necessitates some provision for water, and for at least one holding tank for used water from the kitchen and bath. In many instances, wash water from the kitchen and bath and flushed water from the toilet facilities are drained into separate holding tanks in the RV. In any event, these holding tanks must be drained periodically.

This is conventionally accomplished while on the road at various campgrounds and other areas specializing in the handling of such vehicles. Nearly all such facilities provide a waste dump location, which may be utilized by RV operators for a fee. The RV operator need only access the service compartment of the vehicle, connect a sewage drain hose from the drain outlet in the service compartment to the wastewater drain at the RV service area, and open the appropriate valve(s) in the service compartment. The process takes little time, and the operator is likely to remain in close proximity to the service compartment and drain hose during the operation.

However, such drain hoses are usually left in place between the RV and campsite drain when the RV is parked at a campsite for an overnight or longer stay. Most facilities that handle RVs provide "hookups" at each RV parking or campsite for electrical and water supply for the RV, and for a "gray water" and/or sewage drain from the RV. These hoses and lines are generally left in place between the RV and the corresponding receptacle during the entire time the RV remains parked on the site, which may be anywhere from overnight to several weeks or more.

The sewage drain hose provided for an RV is generally formed of a thin, flexible, plasticized woven fabric having a helically wound wire therein to define the diameter of the hose and to prevent the hose from collapsing. This hose is available in a number of different diameters, and has the advantage of great flexibility and collapsibility along its length for storage. A disadvantage of such hoses is that the ridges formed by the internal wire coil provide traction for rodents, snakes, and/or other vermin to use the hose as a pathway between the ground and the RV to which the hose is attached, much as rats crawl up mooring lines to enter a ship docked at a pier. The sewage or wastewater drain opening through the floor of the RV service compartment is generally at least slightly larger than the diameter of the drain hose, thus allowing small animals to enter the service compartment. Once in the service compartment, they may work their way into the remainder of the vehicle interior. It is well known that most such creatures are attracted to the dark and relatively warm environment found in many areas of an RV, along with the potential for food.

Much the same is also true of other hoses and lines extending from a large RV while parked at a campground or the like. Such RVs will generally have a water supply hose or line connected thereto, as well as an electrical supply cable or line. These various lines all extend from various points external to the RV, into the RV through the service compartment. All such hoses, cables, lines, etc. can provide pathways for rodents, reptiles, and/or other vermin to enter the RV via the service compartment.

A number of different sealing devices have been developed in the past for use in environments different from that of the present invention. The use of static and dynamic seals for use in differential pressure environments (e.g., steam fittings, oil seals for rotating shafts, etc.) is well known. An example of such a static pressure seal is found in European Patent No. 603,775, published on Jun. 29, 1994, which describes (according to the drawings and English abstract) a static seal for a pipe radially disposed from a larger diameter pipe or wall. The elastomer seal is relatively thin, and is adapted to compress within a relatively small gap. The seal does not fill the entire space between the smaller and larger pipes, but only seals the inner end of the smaller diameter pipe relative to the wall through which that smaller pipe passes.

However, the present inventor is unaware of any seals adapted and configured to seal a relatively large gap between a flexible hose, cable, or other line and the opening in a wall or panel through which the line passes. There have been a number of devices developed to respond to another problem with RV holding tank drain hoses, i.e., the problem of the hose coming out of the collection tank opening in the ground due to dynamic pressure causing hose movement during the dumping operation. These devices generally comprise either clamps or weights attached to the distal end of the hose, i.e., the end opposite the RV, and do nothing to seal the hose passage through the wall or panel of the RV service compartment.

None of the above inventions and patents, taken either singly or in combination, is seen to describe the instant invention as claimed. Thus, a pest control seal for a recreational vehicle solving the aforementioned problems is desired.

SUMMARY OF THE INVENTION

A first embodiment of the pest control seal for a recreational vehicle (RV) serves as a seal within the relatively large gap between the outer diameter of a flexible wastewater or sewage hose and the surrounding hose passage through the wall or panel of the service compartment of the RV during times when the hose is deployed from the RV. The seal also serves to preclude abrasion of the hose due to the hard edge of the surrounding hose passage. Other embodiments provide similar sealing about other conduits extending into the RV, e.g., water supply hoses or lines, electrical supply cables or lines, etc., through their respective passages into the service compartment. Each of the seals is a composite assembly, having a relatively soft, resilient plastic foam material somewhat compressed into the annular opening between the hose or line and surrounding passage, and a retainer formed of a relatively thin sheet of hard material (plastic, metal, etc.). The foam seal and retainer may be secured to one another (e.g., adhesively bonded, etc.), if so desired.

The retainer is secured about the hose or line passage through the service compartment panel to retain the foam seal in place while the drain hose or other conduit is deployed. The retainer also acts as a final stop in the event that an animal chews or digs its way through the relatively soft foam. The retainer may be secured in place by the screws conventionally used to secure the flange provided about the opening. Alternatively, separate clips may be used as desired. The retainer may be formed as a single annular component, or may comprise semicircular components to accommodate the larger attachment fittings at each end of the drain hose or line while still providing a close fit about the hose or other conduit.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a pest control seal for temporary installation between any or all of the various hoses, cables, and other conduits that may extend through their respective hose passages in the service compartment of a recreational vehicle (RV). For the purposes of the present disclosure, these various drain hoses, water supply hoses, electrical power supply cables, etc., are generally described as "conduits" extending to and from the vehicle, regardless of their diameter, structure, and function.

Figure 1:
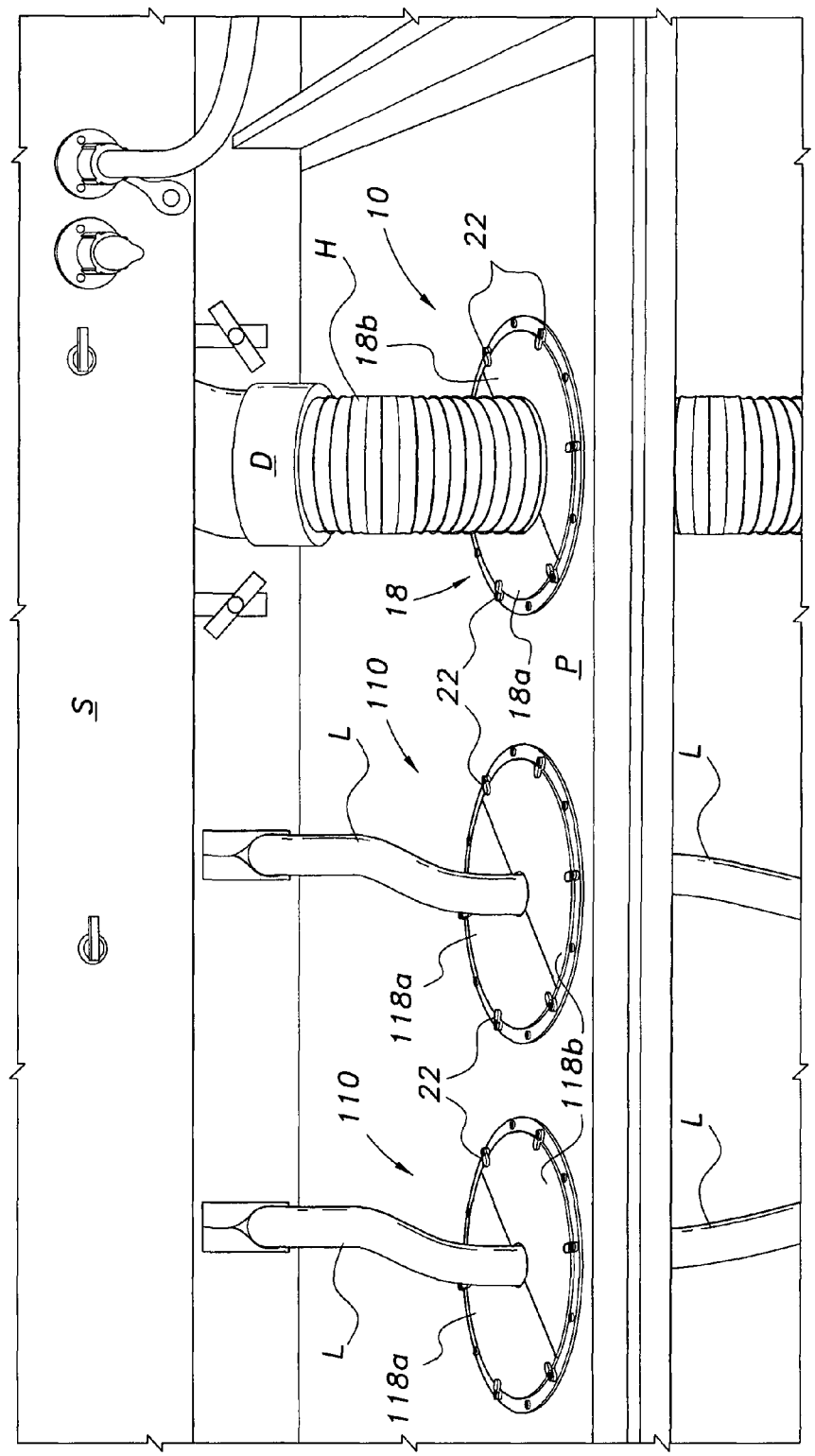
FIG. 1 is an environmental, perspective view of various embodiments of pest control seals for a recreational vehicle (RV) according to the present invention, showing their installation about various drain hose, water hose, and electrical cable lines extending from the service compartment of an RV.
Figure 2:
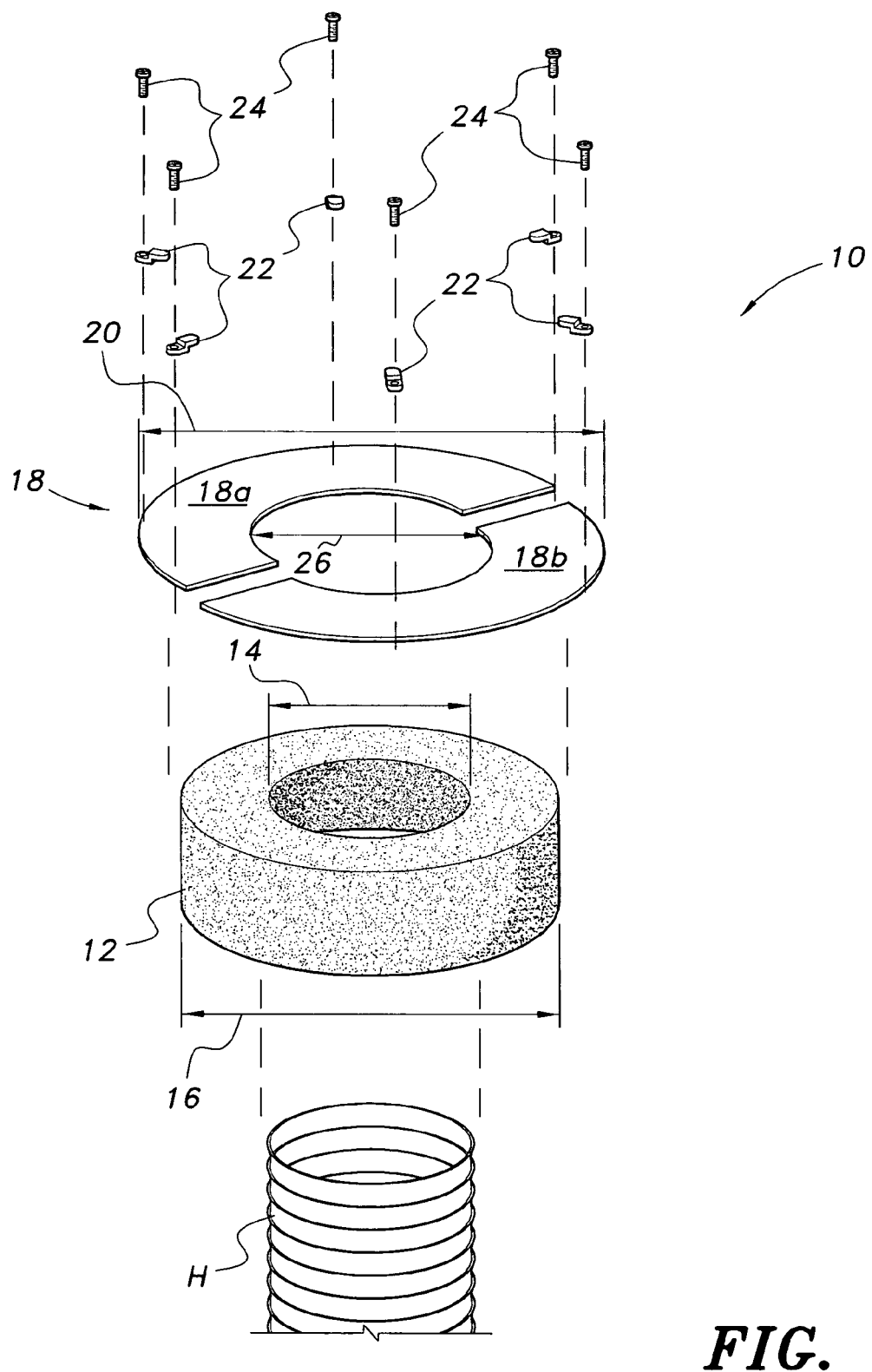
FIG. 2 is an exploded perspective view of the drain hose pest control seal of FIG. 1, showing further details thereof.

FIGS. 1 and 2 of the drawings illustrate two different embodiments of the seal, comprising a relatively large internal diameter drain hose seal 10 and a smaller internal diameter seal 110 for use with smaller diameter water supply hoses, electrical cables, etc. FIG. 1 provides an environmental perspective view of the seals 10 and 110 installed within the service compartment S of a conventional RV, with FIG. 2 illustrating details of the components of seal 10. The smaller internal diameter seal 110 is illustrated in detail in FIG. 5 of the drawings, and discussed further below.

Figure 4:
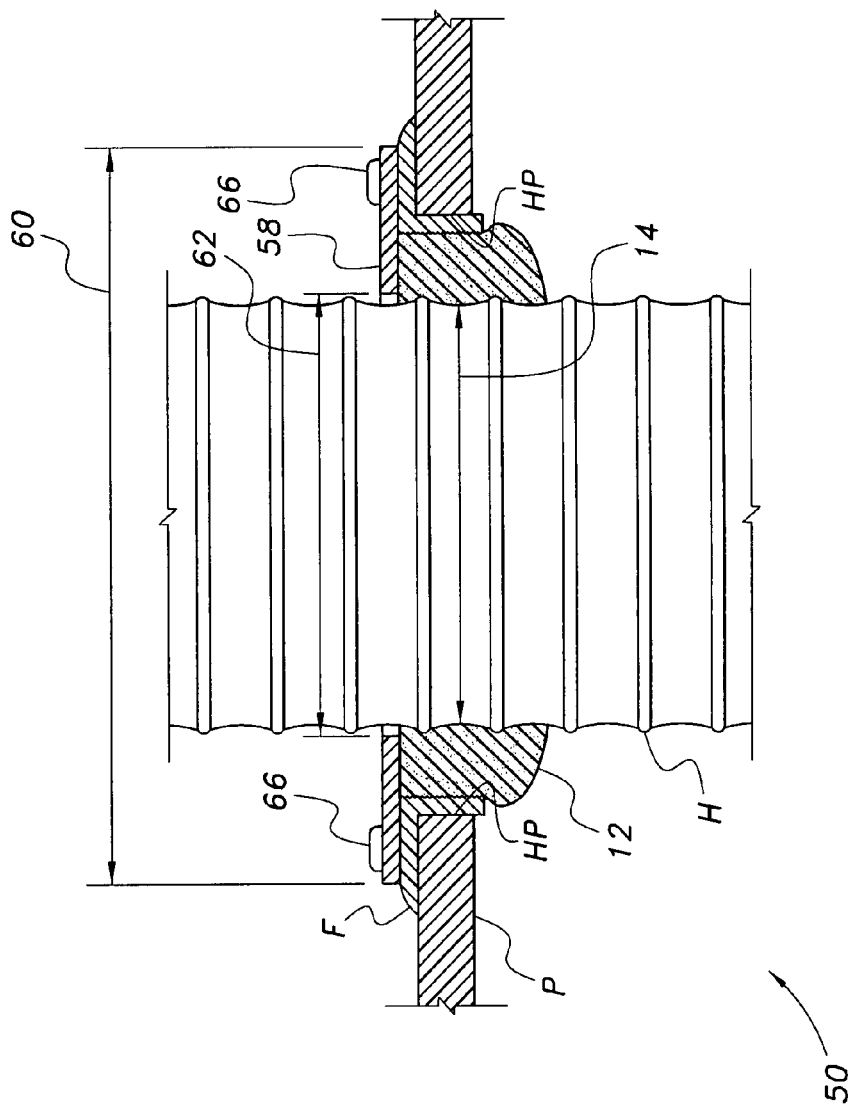
FIG. 4 is a side elevation view in section of the pest control seal embodiment of FIG. 3, showing details of the installation thereof.

In the first embodiment, the seal 10 includes a resilient, compressible closure portion 12 having a generally toroidal configuration adapted to fit closely about the outer diameter of the waste or sewage drain hose H and adapted to be inserted compressibly into the hose passage provided through the hose passage panel P of the service compartment, generally as shown in the embodiment of FIG. 4 and discussed further below. The closure portion 12 is preferably formed of a resilient opened- or closed-cell foam plastic material, e.g., polyethylene, synthetic sponge material, etc. The material should be readily compressible and also provide some elastomeric or resilient properties in order to expand about the outer diameter of the hose H and further to compress into the hose passage of the service compartment S.

The closure portion 12 has an internal diameter 14 that is preferably slightly smaller than the outer diameter of the hose H in order to fit closely about the hose H and preclude the passage of small animals (rodents, reptiles, insects and other vermin, etc.) between the outer wall of the hose H and the closure portion 12. The closure portion 12 has an outer diameter 16 that is slightly larger than the diameter of the hose passage formed through the panel P of the service compartment. The closure portion 12 is compressibly installed between the hose H and surrounding hose passage of the service compartment panel P to provide a vermin-proof seal for the service compartment S.

The seal 10 further includes a retainer 18 formed of a thin, rigid sheet of material (e.g., hard plastic sheet, aluminum, steel, etc.), configured for installation about the hose H and for being removably secured to the hose passage panel P of the service compartment S. In the embodiment of FIGS. 1 and 2, the retainer 18 is formed of two semicircular components 18a and 18b, which, when assembled opposite one another, form an annular plate about the hose H. This two-part configuration of retainer components 18a and 18b allows them to be installed after the hose H has been extended through the hose passage of the panel P and secured to the drain outlet D, generally as shown in FIG. 1 of the drawings. The outer diameter 20 of the retainer 18 (or of the assembly comprising the two retainer components 18a, 18b) is somewhat larger than the outer diameter 16 of the resilient closure portion 12 so that the outer periphery of the retainer 18 extends beyond the diameter of the hose passage through the hose passage panel P of the service compartment S.

This allows the outer portion of the retainer 18 to be captured upon or secured over the edge of the hose passage panel P, e.g., by a series of selectively positionable clips or fingers 22, as shown in FIGS. 1 and 2. Each of the clips 22 has an offset portion, which rests atop the edge of the retainer 18, and an opposite end having a fastener passage defined therethrough. Suitable fasteners, e.g., screws 24, are driven through the holes in the clips 22 and into the hose passage panel P to secure the clips 22 pivotally about the periphery of the retainer 18. The inner diameter 26 of the retainer 18 (or assembly 18a, 18b) is slightly larger than the outer diameter of the hose H in order to avoid damage to the hose H while still retaining the closure portion 12 of the seal within the hose passage of the panel P.

The pest control seal 10 of FIGS. 1 and 2 is installed by first passing the closure portion 12 about the drain outlet fitting attachment end of the hose H (and its attachment fitting, if so equipped), prior to securing the hose H to the drain outlet D, which drains wastewater from a gray water and/or sewage water holding tank (not shown). The closure portion 12 is then stuffed into the opening defined by the hose passage through the hose passage panel P of the service compartment S, and the wastewater or sewage hose H is passed through both the closure and the hose passage. The retainer 18, or more precisely, the two semicircular retainer portions 18a and 18b of the seal 10 of FIGS. 1 and 2, is secured to the panel P about the periphery of the hose passage therethrough and about the hose H by means of the clips or fingers 22 to hold the relatively pliable closure portion 12 in place. The result is that the closure portion 12 completely fills the annular gap between the hose H and surrounding edge of the hose passage, thereby precluding entry of any small animals, such as rodents, reptiles, and other vermin, into the service compartment S and subsequently into the recreational vehicle.

Figure 3:
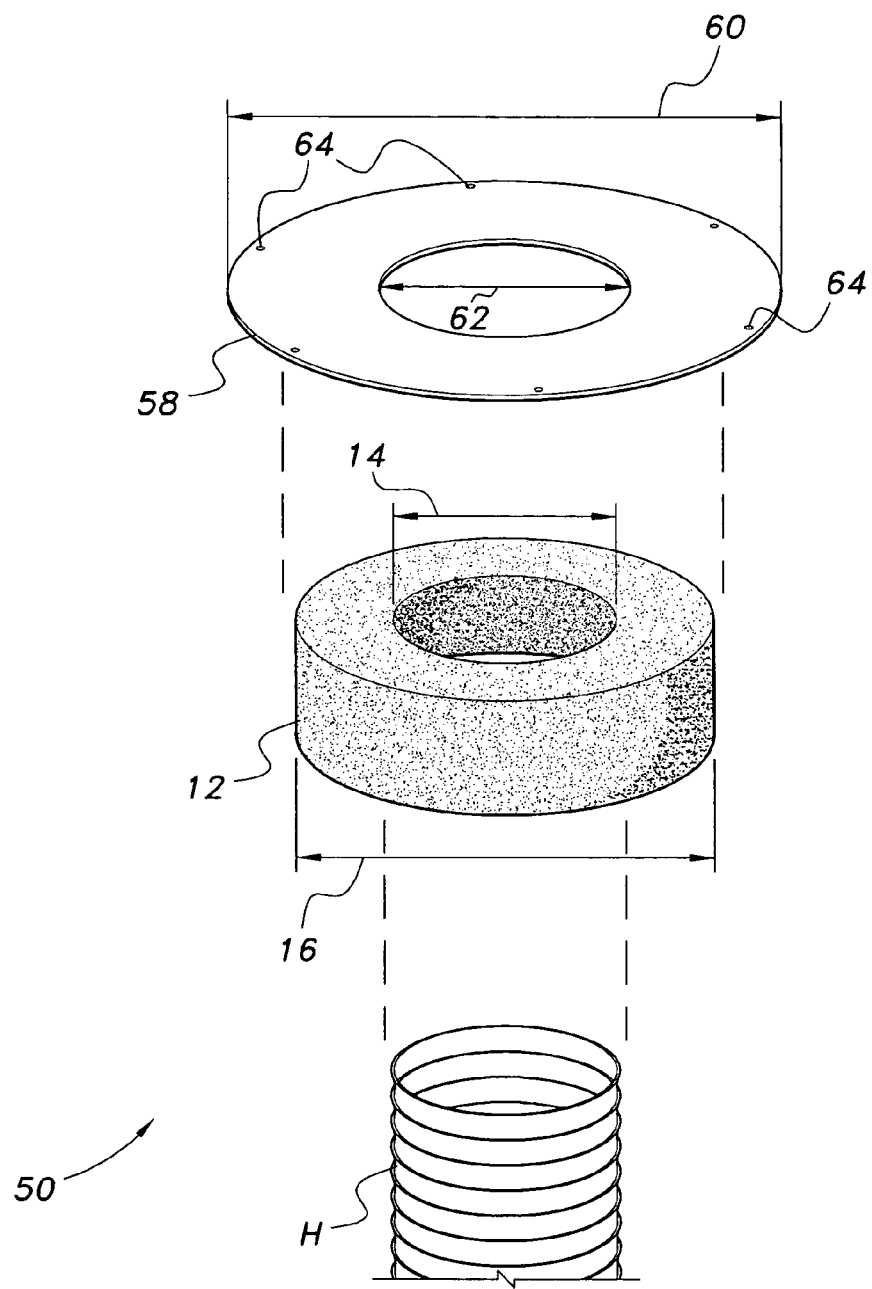
FIG. 3 is an exploded perspective view of an alternative embodiment of the drain hose pest control seal of FIGS. 1 and 2, showing various details thereof.

FIGS. 3 and 4 provide illustrations of a second embodiment of a pest control seal for a recreational vehicle, designated generally as 50 in FIGS. 3 and 4. The pest control seal 50 includes a resilient, generally toroidal closure portion 12, substantially similar to the closure portion 12 shown in FIGS. 1 and 2. However, the retainer 58 of the seal embodiment 50 differs from the retainer 18 of the embodiment 10 of FIGS. 1 and 2. The retainer 58 comprises a single piece of material defining a continuous, unbroken annular ring. In this configuration, the retainer 58 must be passed over the bare end of the hose H, generally as shown in FIG. 3, for installation. Normally, it is envisioned that the larger diameter of the hose connection fitting would preclude passing the unbroken retainer 58 thereover, and the two-piece retainer embodiment 18 of FIGS. 1 and 2 would then be used. However, the single piece retainer 58 of FIG. 3 may be used where possible. As in the case of the retainer 18 of FIGS. 1 and 2, the retainer 58 has an outer diameter 60 that extends beyond the outer diameter 16 of the closure portion 12 in order to extend over the edge of the hose passage, and an inner diameter 62 sufficient to clear the outer diameter of the hose H.

The single-piece retainer 58 also differs from the retainer 18 in that the retainer 58 includes a series of fastener passages 64 about the rim thereof. These fastener passages 64 allow the retainer 58 to be secured directly to the underlying structure, e.g., the hose passage panel P or to a hose passage flange F installed therein, as shown generally in FIG. 4 of the drawings. Alternatively, the unbroken annular retainer plate 58 could be secured in place using the clips or fingers 22 shown in FIGS. 1 and 2, or the two-piece retainer 18 could be provided with peripheral attachment holes for screws or other fasteners, if desired.

The single-piece retainer 58 of FIGS. 3 and 4 also lends itself to permanent attachment to the closure element or portion 12, if so desired. The retainer 58 may be attached to the closure portion 12 by conventional adhesive means, e.g., contact cement, etc. This configuration necessitates the installation of the retainer and closure portion assembly over the bare end of the hose H before connecting the hose H to any fittings or connectors due to the relatively close inner diameter 62 of the retainer 58. However, this configuration retains the two major components together and can facilitate assembly where the end of the hose H is not attached to a larger diameter connector or fitting.

The installation of the seal 50 is shown in cross section in FIG. 4 of the drawings. Conventionally, the hose passage HP of the panel P is provided with a flange F installed therein. The flange F provides a finished edge for the hose passage HP through the panel P, and has internal threads for securing a cover plate in place to close the service compartment when the drain hose H is not deployed. It will be seen in FIG. 4 that the resilient closure portion 12 is of somewhat larger outer diameter in its relaxed state than the inner diameter of the hose passage HP and its flange F, as evidenced by the protrusion of the closure portion material from the bottom of the hose passage HP in FIG. 4. This provides a tight seal against the walls of the hose H and against the inner diameter of the hose passage HP and flange F, thereby assuring that even the smallest animals are precluded from entrance up the hose H and into the service compartment of the RV. The retainer 58 is installed by a series of fasteners, e.g., screws 66, which, in the embodiment of FIG. 4, are the same screws or fasteners used to secure the flange F in place within and around the hose passage HP.

Figure 5:
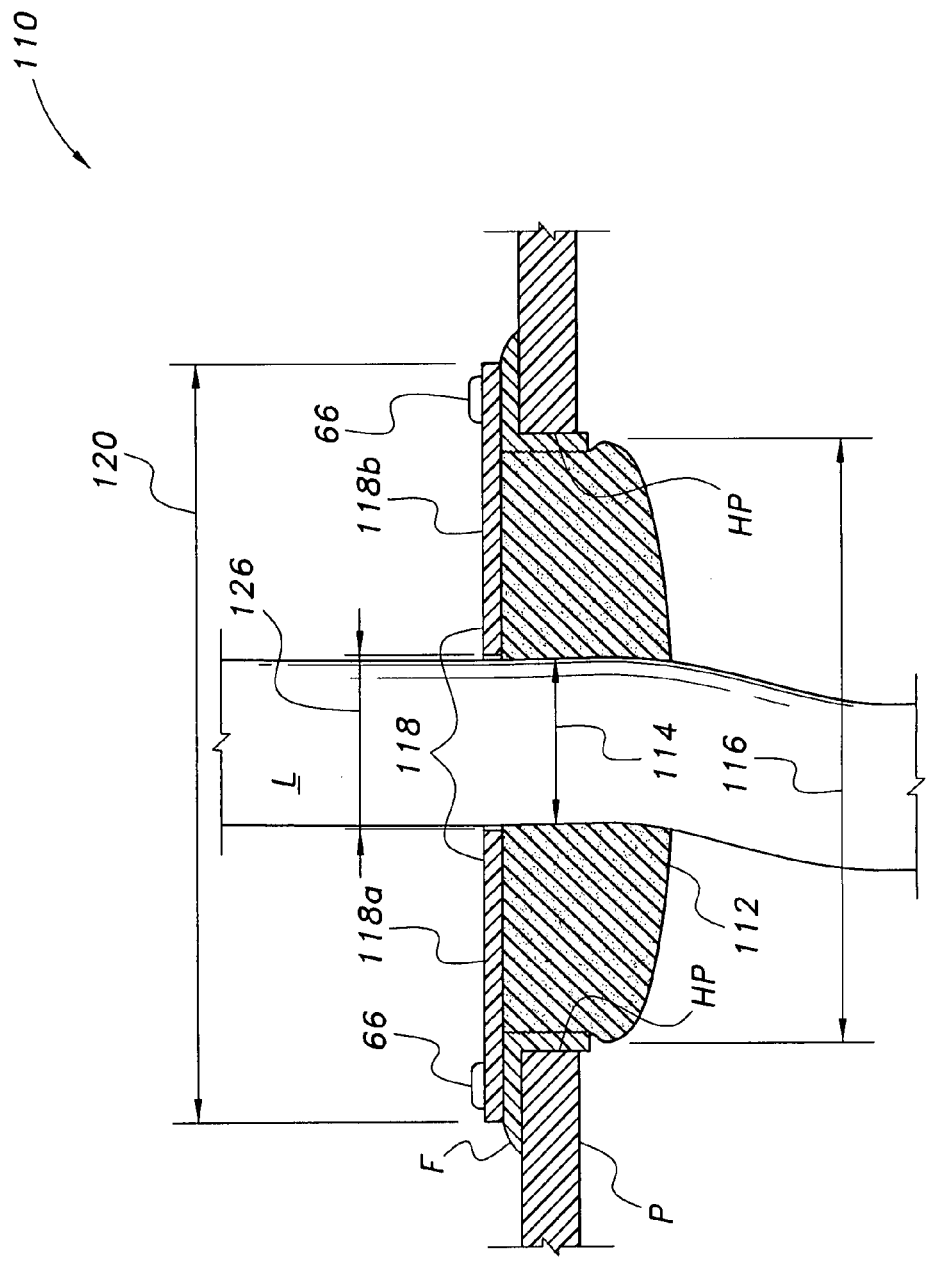
FIG. 5 is a side elevation view in section of an alternative embodiment pest control seal for a smaller diameter hose, cable, or line, showing details of the installation thereof.

FIG. 5 provides a side elevation view in section of a third embodiment of a pest control seal for a recreational vehicle, designated generally as 110. This embodiment is also illustrated as the left and center seals in FIG. 1. The pest control seal 110 differs from the larger internal diameter seals 10 and 50 due to its relatively smaller internal diameter, adapted to fit closely about smaller diameter water hoses, electrical supply cables, and similar small diameter conduits L. The pest control seal 110 includes a resilient, compressible closure portion 112 having a generally toroidal configuration adapted to fit closely about the outer diameter of the relatively small diameter water or electrical conduit L and adapted to be inserted compressibly into the hose passage provided through the hose passage panel P of the service compartment, generally as shown in FIG. 5. The closure portion 112 is preferably formed of a resilient opened- or closed-cell foam plastic material, e.g., polyethylene, synthetic sponge material, etc. The material should be readily compressible and also provide some elastomeric or resilient properties in order to expand about the outer diameter of the conduit L and further to compress into the hose passage HP of the service compartment S.

The closure portion 112 has an internal diameter 114 that is preferably slightly smaller than the outer diameter of the conduit L in order to fit closely about the conduit L and preclude the passage of small animals (rodents, reptiles, insects and other vermin, etc.) between the outer wall of the conduit L and the closure portion 112. The closure portion 112 has an outer diameter 116 that is slightly larger than the diameter of the hose passage formed through the panel P of the service compartment, or more accurately, slightly larger than the internal diameter of the flange F mounted therein. The closure portion 112 is compressibly installed between the conduit L and surrounding hose passage of the service compartment panel P to provide a vermin-proof seal for the service compartment S.

The seal 110 further includes a retainer 118 formed of a thin, rigid sheet of material (e.g., hard plastic sheet, aluminum, steel, etc.), configured for installation about the conduit L and for being removably secured to the hose passage panel P of the service compartment S. In the embodiment of FIGS. 1 and 5, the retainer 118 is formed of two semicircular components 118a and 118b, which, when assembled opposite one another, form an annular plate about the conduit L. This two-part configuration of retainer components 118a and 118b allows them to be installed after the conduit L has been extended through the hose passage of the panel P, generally as shown in FIG. 1 of the drawings. The outer diameter 120 of the assembly comprising the two retainer components 118a, 118b is somewhat larger than the outer diameter 116 of the resilient closure portion 112 so that the outer periphery of the assembled retainer 118 extends beyond the diameter of the hose passage through the hose passage panel P of the service compartment S.

This allows the outer portion of the retainer assembly 118 to be captured upon or secured over the edge of the hose passage panel P, e.g., by a series of selectively positionable clips or fingers 22, as shown in FIGS. 1 and 2. Each of the clips 22 has an offset portion, which rests atop the edge of the retainer 118, and an opposite end having a fastener passage defined therethrough. Suitable fasteners, e.g., screws, are driven through the holes in the clips 22 and into the hose passage panel P to secure the clips 22 pivotally about the periphery of the retainer 18. Alternatively, the retainer assembly. 118 may be secured directly to the flange F, e.g., by screws 66, etc., as shown in FIG. 5. The inner diameter 126 of the retainer 118 (or assembly 118a, 118b) is slightly larger than the outer diameter of the conduit L in order to avoid damage to the conduit L while still retaining the closure portion 112 of the seal within the hose passage of the panel P.

In conclusion, the pest control seal for recreational vehicles greatly improves the security of such vehicles and motor homes relative to the incursion of rodents and/or other vermin into the vehicle. The seal is economical and is quickly and easily installed at the time the wastewater or sewage hose or other conduit is connected to its drain outlet fitting or other connection in the service compartment of the RV, and remains in place with no further attention required during the entire time the hose or conduit is deployed from the vehicle. The seal is quickly and easily removed when the conduit is disconnected from its fitting in the service compartment, where the seal may be stored for future use when required. Accordingly, the pest control seal will prove to be a most desirable and useful accessory for those who own and operate recreational vehicles, motor homes, travel trailers, and similar equipment having holding tanks that require draining from time to time.

It is to be understood that the present invention is not limited to the embodiments described above, but encompasses any and all embodiments within the scope of the following claims.

I claim:

1. A pest control seal in combination with a recreational vehicle, the combination comprising:
 a recreational vehicle including:
  a service compartment having a panel defining at least one passage therethrough; and
  at least one conduit removably installed through the at least one passage of the panel;
 a seal comprising:
  a resilient, compressible closure portion having a substantially toroidal configuration defining a substantially constant inner diameter and a substantially constant outer diameter, the closure portion being adapted for compressible insertion in the passage of the service compartment panel and about the conduit as the conduit passes through the at least one passage;
  a retainer, the retainer consisting of two portions each having a semicircular configuration of substantially constant inner diameter substantially equal to the inner diameter of the closure portion and a substantially constant outer diameter greater than the outer diameter of the closure portion and adapted to be disposed opposite one another about the at least one conduit, wherein each portion further consists of a top surface and a bottom surface wherein the entire bottom surface defines a substantially continuous planar surface, the retainer being formed of a rigid sheet of material; and
  a plurality of clips attached to the panel of the service compartment circumferentially about the at least one passage for selectively securing the retainer to the service compartment panel.

* * * * *